United States Patent
Payne et al.

(12) 
(10) Patent No.: US 6,370,518 B1
(45) Date of Patent: Apr. 9, 2002

(54) METHOD AND APPARATUS FOR DISPLAYING A RECORD FROM A STRUCTURED DATABASE WITH MINIMUM KEYSTROKES

(75) Inventors: Craig Payne, Park City, UT (US); Andrew L. Laursen, San Mateo, CA (US); Jonathan M. Wulff, Los Gatos, CA (US); Alain S. Rossmann, Palo Alto, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/166,822

(22) Filed: Oct. 5, 1998

(51) Int. Cl.⁷ .............................................. G06F 17/30
(52) U.S. Cl. ...................... 707/1; 707/2; 707/3; 707/4; 707/5; 345/764
(58) Field of Search ........................ 707/1–4; 345/123, 345/334, 357, 350, 440, 764, 619; 379/229; 341/22; 455/575

(56) References Cited

U.S. PATENT DOCUMENTS

| | | | |
|---|---|---|---|
| 5,384,579 A | * | 1/1995 | Nakasuji et al. ............. 345/123 |
| 5,446,882 A | * | 8/1995 | Capps et al. ................. 707/104 |
| 5,586,196 A | * | 12/1996 | Sussman ...................... 382/114 |
| 5,594,897 A | * | 1/1997 | Goffman ...................... 707/102 |
| 5,745,716 A | * | 4/1998 | Tchao et al. ................. 345/350 |
| 5,809,415 A | | 9/1998 | Rossmann |
| 5,818,437 A | | 10/1998 | Grover et al. |
| 5,819,286 A | * | 10/1998 | Yang et al. ................... 707/104 |
| 5,844,561 A | * | 12/1998 | Tanimoto et al. ............ 345/357 |
| 5,883,635 A | * | 3/1999 | Rao et al. .................... 345/440 |
| 5,911,485 A | * | 6/1999 | Rossmann ..................... 341/22 |
| 6,016,142 A | * | 1/2000 | Chang et al. ................ 345/334 |
| 6,018,577 A | * | 1/2000 | Roach, Jr. .................... 379/229 |
| 6,073,036 A | * | 6/2000 | Heikkinen et al. ........... 455/575 |
| 6,288,718 B1 | * | 9/2001 | Laursen et al. ................. 707/1 |

* cited by examiner

Primary Examiner—Hosain T. Alam
Assistant Examiner—Anh Ly
(74) Attorney, Agent, or Firm—Beyer Weaver & Thomas, LLP (57) ABSTRACT

An improved query input technique is disclosed in which a user supplies a few character-based queries and is able to retrieve and display at least as portion of a record from a structured database. For every character the user enters, a progressively reduced list of indexes that start with the entered characters is displayed. When a desired index identifying the record is among those indexes being displayed, the user may cease the character entry and scroll a zoom window upon the desired index to explore the full record. Various visual feedback indicators can also be displayed for the benefit of the user. Consequently, the user can access and display pertinent information of a certain record from a database quickly and efficiently with a reduced number keystrokes.

39 Claims, 7 Drawing Sheets

Bakers, Cash & ...
Work  650-487-3300
Home  408-345-8576
Email  bakers@up.com
Add    123 Main Street
       Mt. View, CA
       95345

METHOD AND APPARATUS FOR DISPLAYING A RECORD FROM A STRUCTURED DATABASE WITH MINIMUM KEYSTROKES

BACKGROUND OF THE INVENTION

1. Field of the Invention

The present invention relates generally to the display of information on small display screens, and in particular to a method and apparatus for retrieving and displaying records on a small display screen.

2. Description of Related Art

A structured information database is usually represented by a long list of ordered data or records. More often, it is represented by a list of indexes, each indexing one of the records. In order to locate a certain record identified by an index from the database, a string of characters representing at least a portion of the index must be supplied. A lookup process based on a matching scheme is then followed to retrieve all records identified by the string of characters. In many applications, the string of characters is supplied through a full-size functional keyboard, such as a computer keyboard, and then those records with indexes that match the string of characters are retrieved and presented to a user. Thereafter, the user can decide whether to refine or alter the input string of characters to improve the lookup process.

Figure 1:
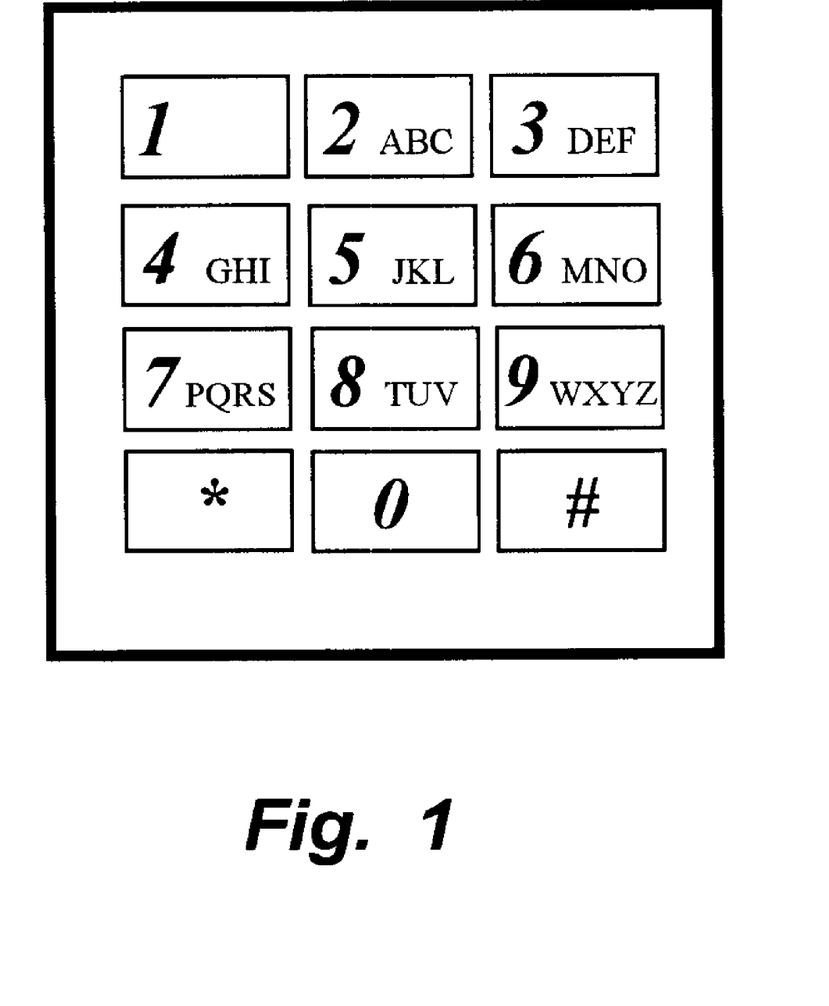
FIG. 1 illustrates one commonly used phone keypad.

In certain applications such as automatic telephone response systems, however, there are no functional keyboards. A common input interface for a telephone uses a numeric-based keypad such as shown in FIG. 1. The keypad comprises twelve keys or buttons representing "0 to 9", "*" and "#" keys. To facilitate the input of characters, each numeric key is commonly assigned to represent certain alphabetical characters as follows:

"1" key is assigned for a special use;
"2" key is for "A", "B" or "C"
"3" key is for "D", "E" or "F";
"4" key is for "G", "H" or "I";
"5" key is for "J", "K" or "L";
"6" key is for "M", "N" or "O";
"7" key is for "P", "Q", "R" or "S";
"8" key is for "T", "U" or "V" and;
"9" key is for "W", "X", "Y" or "Z".

The "*" key and "#" key are also assigned for other special uses.

Conventionally, there are a few different ways to specify a particular character by pressing the numeric keys. For instance, press "2" for "A", "22" for "B", "222" for "C", or "7777" for "S", followed by a character-break flag after each character entry. Typically, the "#" key entry or a pause is used as the character-break flag in some applications. Another way to specify a character using the numeric keys is the use of the ticker symbols, namely, exactly two numeric keys for each character. The first key indicates a group of characters in which a desired character is in. The second key points out the position of the character in the group. For example, press "2" and "1" keys for "A", "2" and "2" for "B", "2" and "3" for "C" or "7" and "4" for "S".

Figures 2A, 2B:
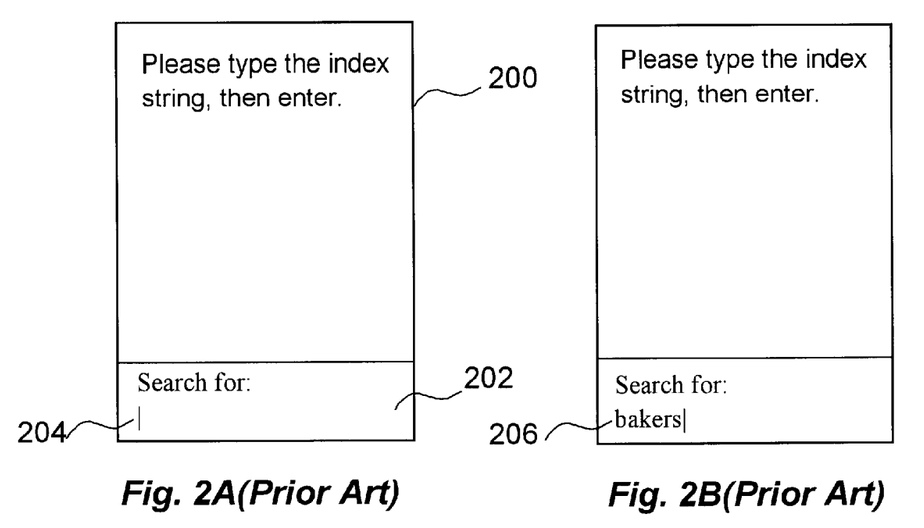
FIGS. 2A to 2C illustrate a set of screen displays commonly seen to retrieve and display a desired record.

FIG. 2A illustrates a display screen 200 conventionally used to retrieve and display a record from a database. Screen 200 typically provides an entry area 202 in which a user can type in an index or query at cursor position 204. FIG. 2B shows that a query "bakers" 206 has been typed in the entry area 202 to retrieve all records having the string "bakers".

Figure 2C:
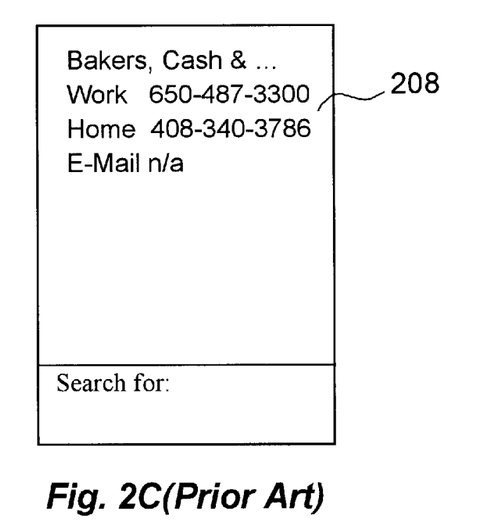

After a predefined keystroke which initiates the search, FIG. 2C shows a full record 208 having a string that matches with the query for "bakers" 206. This method, which for example is commonly seen in libraries, requires a multiple-character query input and is well suited to a system with a full-size input interface such as a computer keyboard. Often, the more detailed the query that is provided, the better the matched records that are retrieved and displayed.

Many portable devices, however, are equipped with only a reduced-size input interface such as phone keypad or some displayed soft keys. Using a phone keypad to type in a detailed query can be laborious and impractical. For example, to retrieve the full record indexed by "bakers" in FIGS. 2A to 2C, the first key-in method would require a keystroke sequence of "22#2#55#33#777#7777#" and the second method would require a keystroke sequence of "222152327374", both demanding over ten keystrokes in the phone keypad. For devices, such as a cellular phone or a two-way page, equipped with a small screen, the above conventional query methods are often workable but neither convenient nor efficient.

There is therefore a need for an improved input query technique that is well suited for devices with small screens and a limited input interface.

SUMMARY OF THE INVENTION

The present invention has been made in consideration of the above described problems and needs and has particular applications to portable devices with a small screen and limited input interface. The portable devices may include, but are not limited to, mobile computing devices, cellular phones, palm-sized computer devices, personal digital assistant devices and Internet-capable appliance remote controllers. According to the invention, users are able to interact with the screen and input interface of these mobile devices to obtain pertinent information with a reduced number of keystrokes or button selections.

The present invention pertains to an improved query input technique in which a user supplies a relatively few character-based query entries and is able to retrieve and display at least as portion of a record from a structured database. For every character the user enters, a progressively reduced list of indexes that start with the entered characters is displayed. When a desired index identifying the record is among those indexes being displayed, the user may cease the character entry and scroll a zoom window upon the desired index to explore the full record. Various visual feedback indicators can also be displayed for the benefit of the user. Consequently, the user can access and display pertinent information of a certain record from a database quickly and efficiently with a reduced number of keystrokes.

According to one aspect of the present invention, a user supplies a few character-based queries to retrieve and display a record from a structured database. For every alphabetical character the user enters from a numerical keypad, a progressively reduced list of indexes that start with the entered characters is displayed. When a desired index identifying the record is among those indexes being displayed, the user may cease the character entry and scroll a zoom window upon the desired index to explore the full record. According to another aspect of the present invention, the zoom window maintains a display of an index and at least one field of a record. Consequently, the user can access and display pertinent information of a certain record from a database quickly and efficiently with minimum keystrokes.

According to one embodiment, the present invention is a method for displaying a record from a structured database on a display screen of an electronic device having a reduced-size input interface. The structured database includes a plurality of records, and the records include at least one field and are indexed by indexes comprising n characters. The method includes the acts of: displaying on the display screen a portion of indexes from the structured database; receiving successively n symbols from the input interface, the n symbols sequentially and respectively corresponding to the n characters of a desired index of the indexes for the records of the structured database, each of the symbols representing a group of characters one of which corresponds to the associated $n^{th}$ character of the desired index; and displaying on the display screen a reduced portion of the indexes, including the desired index, from the structured database, the reduced portion displays those of the indexes where each of the n characters in the indexes is respectively matched by one of the characters of the group of characters represented by the each of the symbols.

According to another embodiment, the present invention is a method for displaying a record from a structured database on a screen, the record including at least one field and indexed by a desired index comprising a string of characters, the method includes the acts of: displaying on the screen a portion of indexes from the structured database; receiving a first symbol if the desired index is not among the indexes being displayed in the screen; the first symbol representing a first group of characters one of which is a first character in the string of characters of the desired index; and indicating the desired index with a cursor when the desired index is among the indexes being displayed in the screen and the cursor is scrolled to the desired index.

In one preferred embodiment, the cursor is a zoom window that surrounds the desired index. The zoom window may further display one field of information of the record to facilitate the display of a piece of pertinent information in the record.

According to yet another embodiment, the present invention is an apparatus for displaying a desired record from a structured database on a screen, the record including at least one field and indexed by a predefined index comprising a string of characters, the device includes: a screen driver commanding the screen; an input interface; a memory for storing code for an application module; and a processor coupled to the memory, the input interface and the screen driver. The processor executes the code in the memory to cause the application module to drive the screen driver to: display on the screen a portion of indexes from the structured database; position a zoom window on one of indexes being displayed on the screen, where the zoom window displays the one of indexes along with a field of a record indexed by the one of indexes; and move the zoom window to the desired index when a navigation key is being activated and the desired index is among the indexes being displayed in the screen, where the zoom window displays the desired index and the at least one field of the desired record.

According to still another embodiment of the invention, the present invention is a computer readable medium including computer program code for displaying a record from a database on a display screen of an electronic device having a reduced-size input interface. The database includes a plurality of records, and the records include at least one field and are indexed by indexes of alphanumeric characters. The computer readable medium including: computer program code for receiving a first symbol from the input interface, the first symbol pertaining to a first group of alphanumeric characters, and the first alphanumeric character of a desired index of the indexes for the database being one of the alphanumeric character of the first group; computer program code for retrieving a first list of the indexes of the database in which their first alphanumeric character matches one of the alphanumeric characters of the first group; computer program code for displaying on the display screen at least a portion of the retrieved first list of the indexes, the desired index being one of the indexes; computer program code for receiving a second symbol from the input interface, the second symbol pertaining to a second group of alphanumeric characters, and the second alphanumeric character of the desired index of the indexes for the database being one of the alphanumeric character of the second group; computer program code for retrieving a second list of the indexes of the database in which their first alphanumeric character matches one of the alphanumeric characters of the first group and their second alphanumeric character matches one of the alphanumeric characters of the second group; and computer program code for displaying on the display screen at least a portion of the retrieved second list of the indexes, the desired index being one of the indexes.

Accordingly, one of the objects in the present invention is to provide a generic solution to displaying a record on a small screen from a structured database with minimum keystrokes on a limited input interface.

Other objects, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings, in which:

DETAILED DESCRIPTION OF THIS INVENTION

Notation and Nomenclature

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of present invention.

The detailed description of the present invention in the following is presented largely in terms of procedures, steps, logic blocks, processing, and other symbolic representations that resemble of data processing devices including mobile phones, two-way pages, telephones and remote controllers. These process descriptions and representations are the means used by those experienced or skilled in the art to most effectively convey the substance of their work to others skilled in the art. The present invention is a method for using a small screen and a reduced number of keystrokes or button presses to identify a record from a structured database. The method along with an apparatus to implement the method to be described in detail below is a sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

The Preferred Embodiments

In view of the index lookup process, prior art solutions for displaying a record from a structured database have attempted to enable a user to adapt to the information being structured and to retrieve the information in a way that the lookup process works. The index lookup process is capable of providing a successful way for looking up a desired string throughout a structured database and often used in systems with a full functional keyboard. When a portable device is not equipped with a full functional keyboard but has a display screen therein and a limited set or keys or buttons, the lookup process can be used in conjunction with the visual feedback provided in the display screen so as to facilitate an efficient retrieval of pertinent information from a database with minimum (or at least a reduced number) keystrokes.

Thus, it is desirable to have a solution that provides an easy and fast key entry method for displaying a desired record from a structured database on a display screen. Obviously, this solution can be advantageously used on small portable devices with screens that may include cellular phones, two-way pagers, palm-sized computers, personal digital assistants and remote control devices.

Figure 3A:
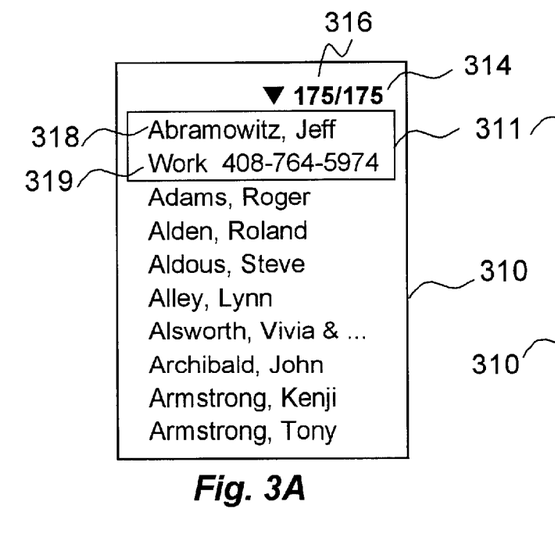
FIGS. 3A to 3H illustrate a sequence of screen displays with respect to processes in one embodiment of the present invention.
Figure 3B:
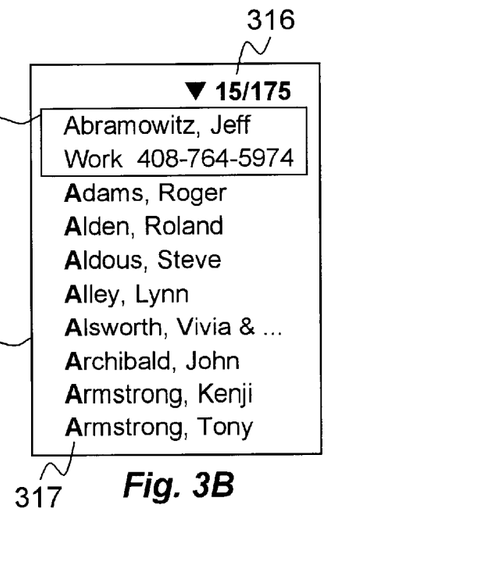
Figure 3C:
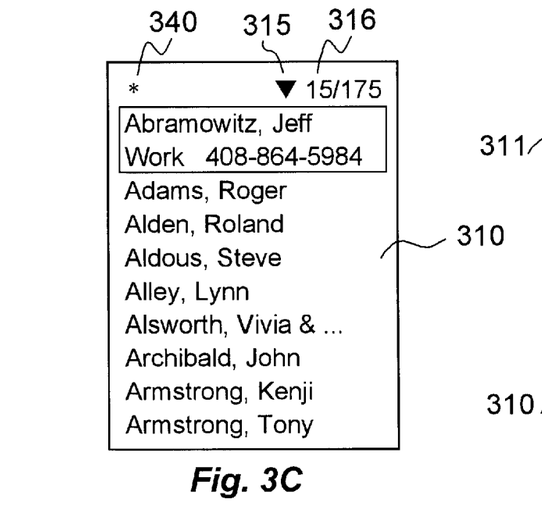
Figure 3D:
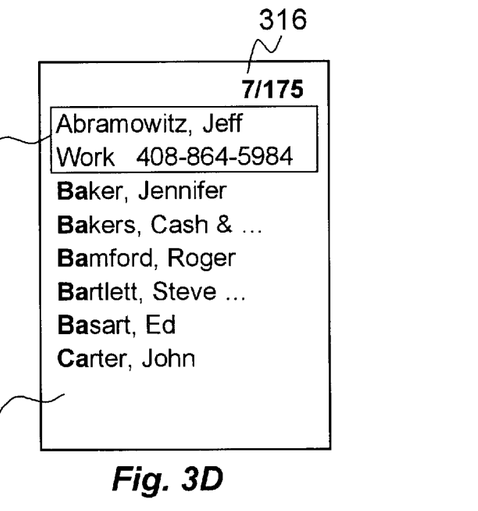

According to the principles of this invention, FIGS. 3A to 3E illustrate a sequence of screens to demonstrate the retrieval of a desired record using minimum key strokes from a structured database in conjunction with the visual feedback. As used herein, the structured database means that all the records in the database are sorted with respect to the indexes in either an ascending or descending order. According to one specific database, each of the records in the database has a first name and a last name, limited number of fields, such as first field, a second field, etc. FIG. 4 shows an exemplary record 400 in which last name 402 is used as an index of record 400. To retrieve the record, at least a portion of the index must be supplied. First field 404 is a work phone number, second field 406 is a home phone number, third field 408 is an email address and fourth field 410 is a home address. It should be pointed out that any of the fields could be used as the index of record 400 and none of the fields have to have information therein. Traditionally, a name, particularly the last name, is used as an index when the structured database is associated with an address book.

To facilitate the description of the present invention, the structured database in the following example is a collection of address information that is sorted in an ascending order. Each record of the address information is indexed with a last name. As will be appreciated by those skilled in the art, the present invention is not limited to this particularity and can be applied equally well to other databases.

Returning now to FIG. 3A, screen 310 is intended to display the indexes of all records in the structured database. Because of the limited size of screen 310, only a first portion of the indexes can be displayed. Optionally, indicator or zoom window 311, pre-selects a first index "Abramowitz" 318 and zooms in to provide one field information 319. Zoom window 311 allows a user to quickly glance at some commonly referred information, such as a work phone number or a home phone, when being placed on a chosen index.

According to one embodiment, zoom window 311 shows an initially chosen index 318 along with a field 319 of the record. This leaves a visual impression to a user that zoom window 311 is scrollable so as to allow scrolling to an index of interest. Preferably, zoom window 311 displays more than just an index. The number of fields as well as which one or more fields of the associated record are caused to be displayed upon selecting one of the indexes, however, does not affect the operation of the invention and largely depends on the actual implementation preference. For example, zoom window 311 may be chosen to display chosen index 318 and two fields, for example, a full name, a work phone number and a home phone number. Nevertheless, the number of the fields caused to be displayed in zoom window 311 determines the available space to display the rest of the indexes in screen 310.

To provide more visual feedback to the user, total index number 314 as well as match (or chosen) index number 316 are preferably displayed of the screen 310. For example, the total index number 314 and the match index number 316 can be displayed in one of the corners of the screen 310. Total index number 314 indicates the number of records in the database and the matched index number 316 tells the number of indexes that match an input query by the user. Since the user has not made any query, match index number 316 is optionally set to total index number 314 (see FIG. 3A). It should be pointed out that the display of total index number 314 and match index number 316 are not necessarily required to practice the present invention, however, they provide the user some knowledge about the database and help the user to determine if a refined query is necessary.

In the following representative example, it is assumed that the user wants to view a record indexed by a last name "Bakers". Since the displayed indexes in screen 310 does not include "Bakers", so the user proceeds with a first query using a phone keypad. The phone keypad is, for example, such as shown in FIG. 1. However, other reduced size input interfaces with keys or buttons can also be used. Since the desired index starts with a character "b", a numeric key "2"

is initially pressed. The numeric key "2" in a phone keypad means "a", "b" and "c". In response to the first key entry, FIG. 3B shows that all indexes started with "a", "b" or "c" are chosen and the first portion of the chosen indexes can be displayed on the screen 310. As shown in FIG. 3B, match index number 316 now indicates the number of indexes that match the numeric key "2" which is equivalent to the query "a", "b" and "c". In other words, any of the indexes of the structured database having a first character that begins with an "a", "b" or "c" is displayed on the screen 310. Optionally, the zoom window 311 pre-selects the first index in the list of indexes displayed on the screen 310.

Further, the first character 317 in the indexes can also be highlighted to provide the visual feedback to the user how many characters have been entered. In some display screens, the characters may not be able to be highlighted. Alternatively, an indicator, for example, a asterisk ("*") may be displayed on the screen 310 to indicate that a character has been entered. One asterisk can be provided for each character of the query input that has been entered. FIG. 3C shows a possible screen 310 in which one asterisk "*" 340 is displayed, meaning that one query input has been entered.

Still further, an arrow sign 315 can also be provided on the screen 310 to provide additional feedback to the user (see FIG. 3C). The arrow sign 315 indicates that a current list of indexes is not completely displayed and that there are more indexes which could be displayed if a cursor or zoom window 311 is moved in the direction indicated by the arrow sign 315. The arrow sign 315 shown in FIG. 3C is one example of a suitable graphic symbol that can be displayed to provide this feedback to the user. However, other graphic symbols having a different appearance can also be used to inform the user that there are more indexes in the list that are not able to be displayed.

It may be noticed that one of the distinctions in the present invention from the prior art systems is that the user is constantly and visually informed of those of the indexes that match the input query. In this example, "b" was originally intended, but numeric key "2" was the symbolic key that was entered and thus results in the equivalence of "a", "b" and "c". As such, the query results being displayed after entering the numeric key "2" are those indexes that have their initial character beginning with "a", "b" or "c". The matched (or chosen) index number 316 then informs the number of indexes (e.g., 15) satisfying the entry.

Since the number of the matched or chosen indexes is still fairly large, namely the user does not see the desired index in the screen after the first character entry, a second numeric key "2" is pressed for the second character "a" in the desired index. As shown in FIG. 3D, matched index number 316 now indicates the number of the matched indexes is 7, which means that there are seven indexes that have the first character being "a", "b" or "c" and have the second character being "a", "b" or "c". Again the first and second characters in the indexes are optionally highlighted to provide the visual feedback to the user how many characters have been entered. Alternatively, two asterisks can be displayed indicating that two characters of query input have been entered. Meanwhile the user determines if there is any need to provide a further refinements to the query. Typically the user repositions or scrolls zoom window 311 downward to the desired index by a special key (as a navigation key) if the desired index becomes visible in the screen regardless how many are in the chosen indexes.

Figure 3E:
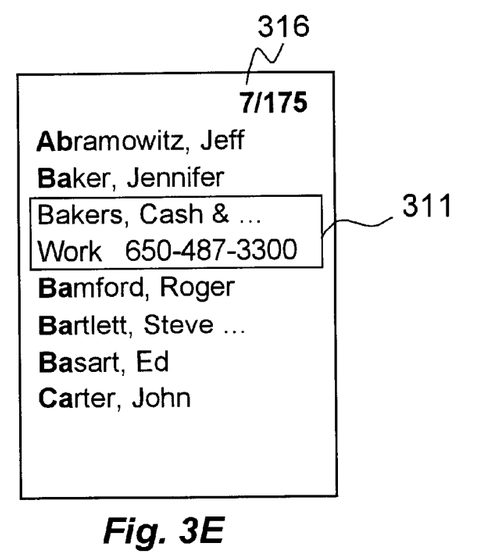
Figure 3F:
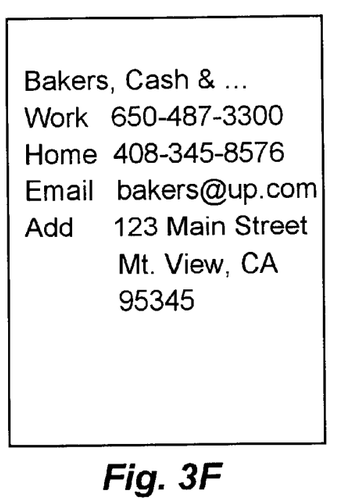
Figure 4:
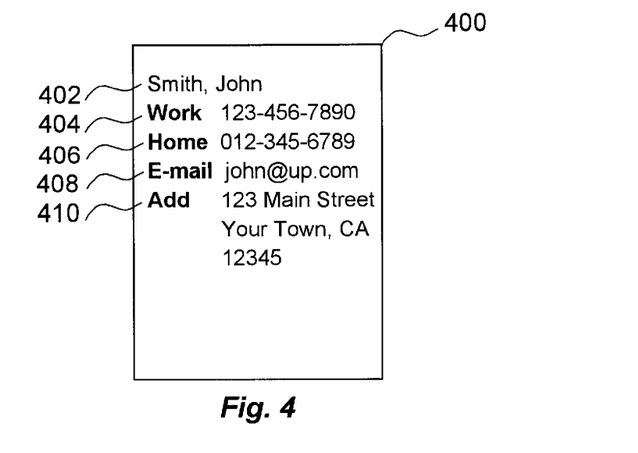
FIG. 4 illustrates an exemplary record used in the description of the present invention.

As shown in FIG. 3D, screen 310 does include the desired index "Bakers", so the user may scroll zoom window 311 downward to the desired index "Bakers" as shown in FIG. 3E. Upon positioning on the desired index "Bakers", zoom window 311 displays the desired index along with a field. As noted previously, the zoom window 311 can display one or more fields of the record associated with the desired index. In the embodiment shown in FIG. 3E, the zoom window 311 displays the desired index and the work phone number. If the user desires to view the whole record, a predefined key can be pressed to display the full record as shown in FIG. 3F.

Figures 3G, 3H:
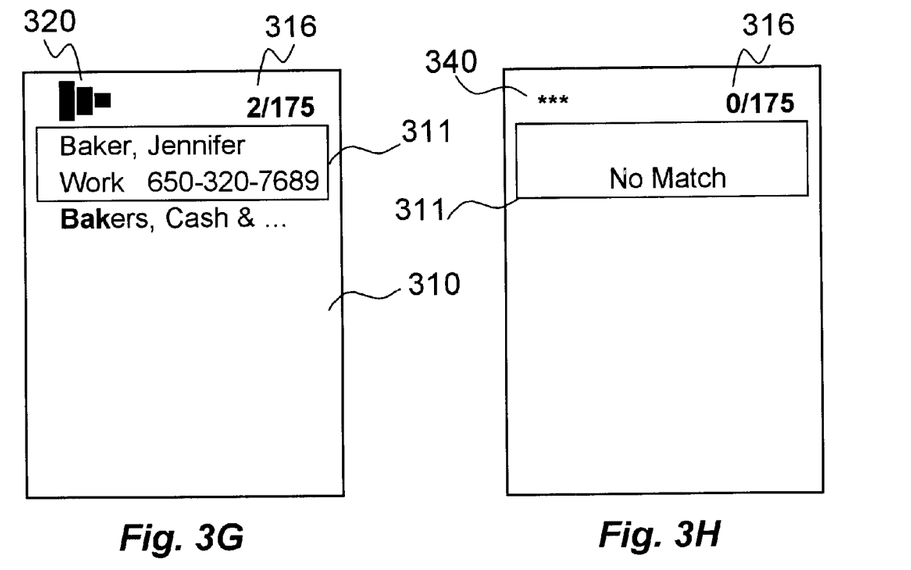

Alternatively, the user may press a numeric key "5" for a third character "k" to further refine query and thus the retrieval process. FIG. 3G shows that the screen 310 now displays only two indexes 316 following the input of the numeric key "5" for a third character. The resulting combined query input then retrieves those indexes that start with the first character being "a", "b" or "c", the second character being "a", "b" or "c", and the third character being "j", "k" or "l", and thus satisfy the entries of the numeric keys "1", "1" and "5". The user can then scroll the scroll zoom window 311 downward by one index to select the desired index and explore the record if desired.

Optionally, a search progression graphic or indicator may be displayed on display screen 310 to provide feedback to the user. The search progression graphic or indicator can take a variety of different appearances and forms, but serves to inform the user how well the query or refinements to the query are proceeding with each input of the query. In one embodiment, the search progression graphic or indicator is displayed as a narrow-down sign that is structured by several rectangular bars in different heights. Each bar indicates a list of chosen indexes corresponding to each character entered and the height of the bar graphically correlates to the number of matched indexes. Generally, the number of matched indexes becomes progressively smaller for every entered character, the heights of the bars are shortened accordingly.

More particularly, narrow-down sign 320 in FIG. 3G shows that three entries have been entered and the number of matched indexes is decreasing. It indicates to the user that the query (lookup) process per each entry is successfully proceeding, and that the number of matched indexes has been narrowed down. In other words, if the user enters a character that none of the remaining indexes can match, then narrow-down sign 320 remains unchanged, indicating an invalid or void entry.

FIG. 3H demonstrates a display resulting from an entry after three successful keystrokes. For example, assume that the user enters the numeric key "8" as corresponding to the character "t". It can be seen that none of the two left indexes in FIG. 3G can be matched to the equivalent entries "t", "u" and "v". Thus zoom window 311 has no matched record to display and sign 340 remains unchanged. In this example, the user's entry of "t" would be an error because the fourth character of the desired index is "e", which should have cause the user to enter the numeric key "3". The user may undo the latest entry by activating a predefined key to return to a previous screen or start the query processing all over.

Figure 5:
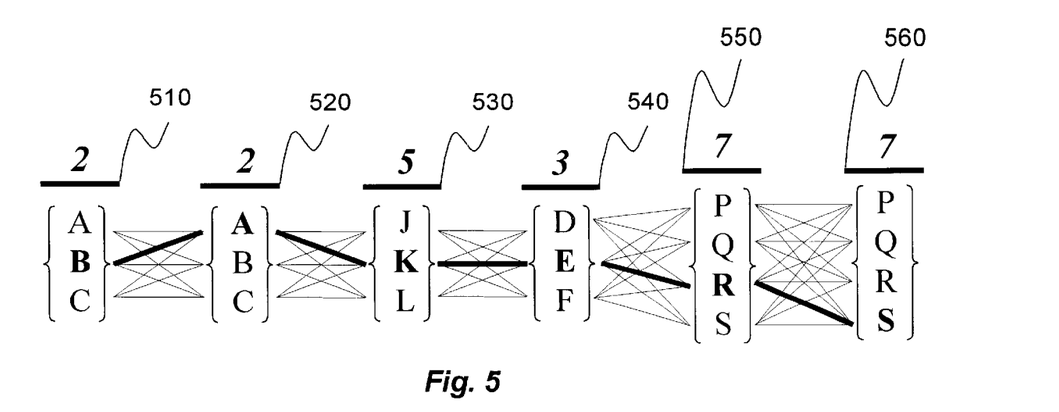
FIG. 5 demonstrates an inherent process with respect to entries provided by a user through an input interface.

FIG. 5 illustrates a look-up process working in concert with each of the entries described above and should be understood in conjunction with FIGS. 3A to 3G. The look-up process may be implemented with reference to the indexed sequential search or binary search, which are well known to those skilled in the art. When the first keystroke "2" is entered, the look-up process proceeds with a query 510 equivalent to three entries "a", "b" or "c" and returns all indexes starting with "a", "b" or "c". When the second keystroke "2" is entered, the look-up process proceeds with a query 520 equivalent to nine entries "aa", "ab", "ac", "ba", "bb", "bc", "ca", "cb" or "cc" and returns all indexes starting with "aa", "ab", "ac", "ba", "bb", "bc", "ca", "cb" or "cc". As described above, the purpose of the keystroke is to bring the desired index into the screen so that a user visually knows where to scroll the zoom window. If the desired index is still not shown in the screen, then an additional keystroke "5" is entered, which causes the look-up process to return all indexes starting with the following string:

"aaj", "abj", "acj", "baj", "bbj", "bcj", "caj", "cbj", "ccj", "aak", "abk", "ack", "bak", "bbk", "bck", "cak", "cbk", "cck" "aal", "abl", "acl", "bal", "bbl", "bcl", "cal", "cbl" or "ccl".

Numerically, the number of combinations of the queries is increased with any additional keystroke entries. Practically, the number of the indexes that match any of the queries is substantially decreased because the match is much more restrictive. Therefore, the number of the matched indexes returned by the look-up process is substantially decreased with any additional keystroke entries, which eventually brings the desired index to the screen with only a few keystrokes.

For completeness, although unlikely in practice, additional keystrokes 530, 540, 540 and 560 will guarantee to cause the desired index "bakers" to be displayed on the screen. The thick line in the FIG. 5 shows the actual combination of the keystrokes that lead to the desired index.

It should be pointed out that the above description is equally applied when a user enters a string of characters without looking at the screen. For example, "225377" may be successively entered to retrieve particularly the record indexed by "bakers".

Figure 6:
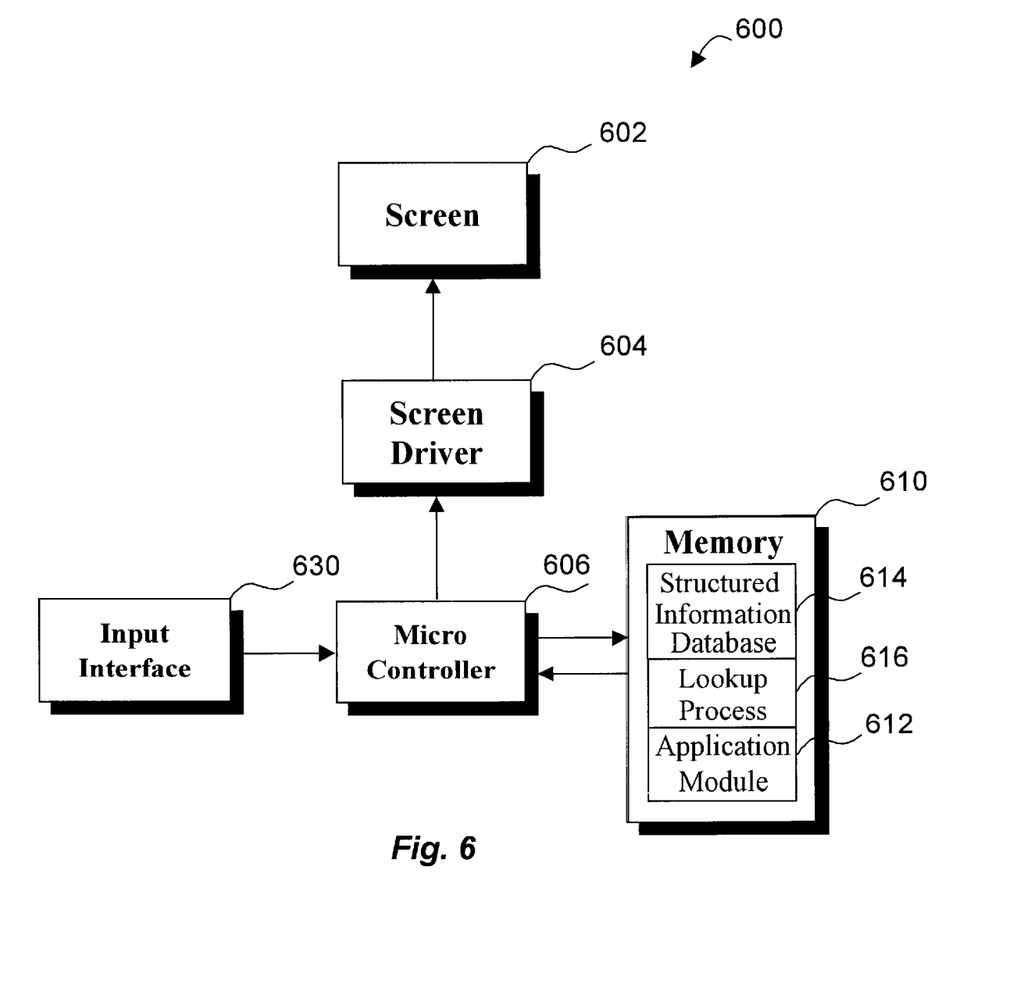
FIG. 6 shows an internal functional block diagram of a portable device in which the present invention may be practiced.

FIG. 6 illustrates an internal functional block diagram of a portable device 600 in which the present invention may be practiced. Portable device 600 may include, but not be limited to a cellular phone, a two-way pager, a palm-sized computing device, and a personal digital assistant. The portable device 600 also has a small screen 602 (i.e., reduced-size screen) that may be a LCD screen. Screen 602 is communicated with and commanded by a screen driver 604 that is controlled by a microcontroller (processor) 606. Memory 610 includes a compiled and linked version of one implementation of the present invention as an application module 612. When microcontroller 606 executes application module 612, screen driver 604 is caused to generate control signals to drive screen 602 to display according to application module 612.

According to one implementation, a structured database 614 is loaded in memory 610 that further includes code for a lookup process 616. When device 600 is powered on, both application module 612 and lookup process 616 are executed on microcontroller 606. Input interface 630 coupled to and controlled by microcontroller 606 receives inputs (queries) from a user. Screens in FIGS. 3A to 3H are some of the examples that may be displayed by screen driver 602 according to application module 612 in conjunction with lookup process 616 and queries.

As described above, input interface 630 may be a phone keypad. It should be pointed out that a regular phone keypad is not the only input interface that can practice the present invention. Some of portable devices sometimes have no physical keys at all, such as those palm-size computing devices that, however, use soft keys or icons as an input means for users to interact with the devices. In the above description, unless otherwise specifically described, it is clear that keys or buttons are generally referred to as either the physical keys or soft keys.

Figure 7:
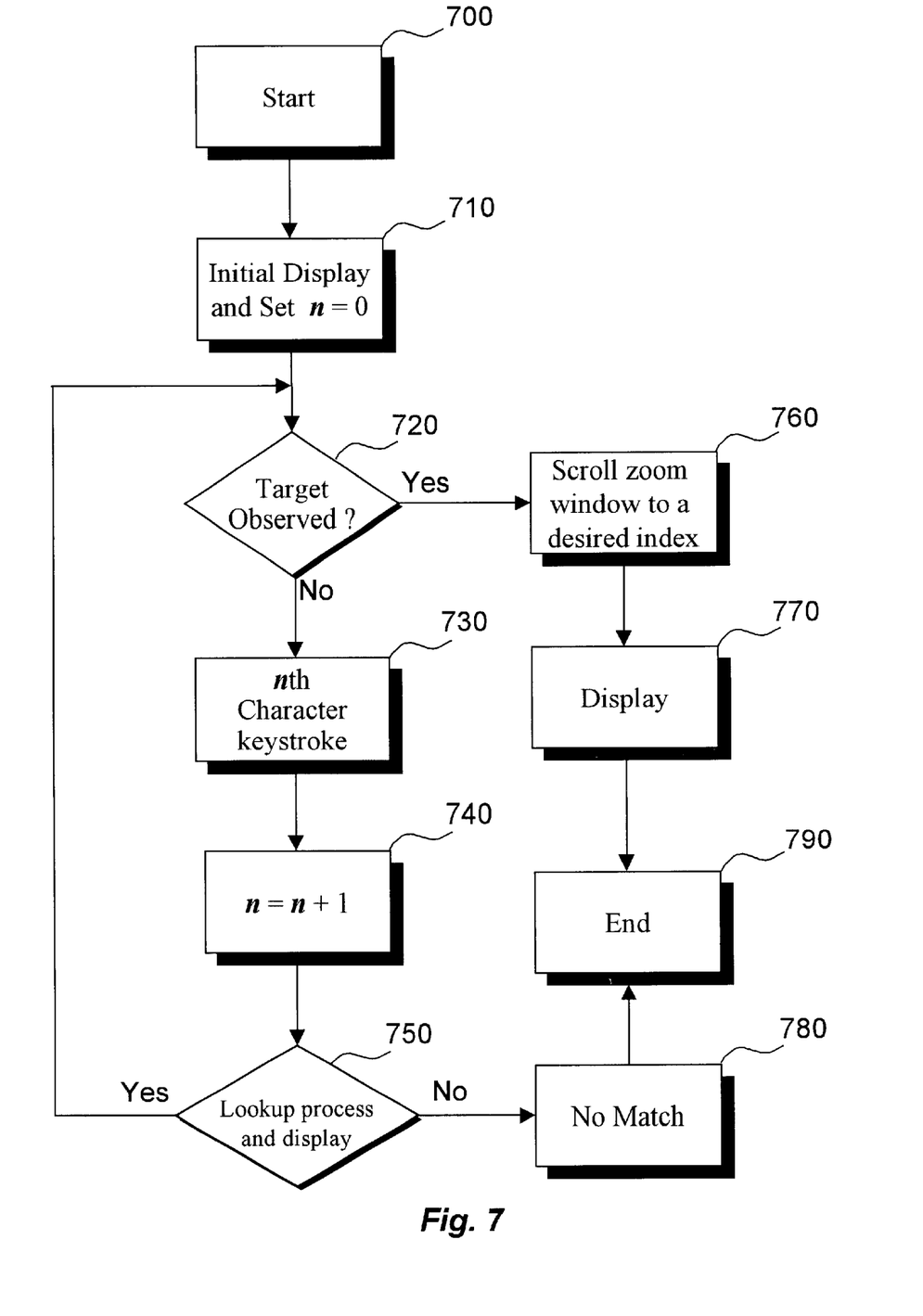
FIG. 7 illustrates a flowchart diagram in the present invention according to one embodiment.

FIG. 7 illustrates a process flowchart of the present invention according to one embodiment and shall be understood in conjunction with FIG. 6. At 700, a portable device is powered on or the lookup process is activated. A first portion of indexes from the database is displayed on the screen and a counter is set to zero at 710. The counter records the number of the character entries and can be used to indicate to a user how many characters have been entered.

At 720, the user determines if a desired index is among the indexes being displayed. When the desired index is not displayed, the user enters a character query at 730. The counter is incremented by one every time the user enters a character query at 740. The look-up process proceeds at 750 with the entered character and returns to 720 all indexes that have the entered character at the corresponding character location. If the look-up process fails to identify any index in the database that matches the entered character and all precedent characters, an error message is displayed at 780.

When the desired index is among the indexes being displayed following the look-up process at block 750, the processing returns to block 720 where the matching indexes are display on the screen 602. Then, when the desired index is being displayed, the user can scroll the zoom window to the desired index in a known direction at 760. It is described that the zoom window displays an index and preferably a field of a record when the zoom widow is being scrolled over from one index to another (adjoining indexes) until reaching the desired index. In other words, the zoom window displays an index and one or more associated fields whenever it is placed upon the index. At 770, a full record indexed by the desired index can be displayed if a predefined key is activated.

On the other hand, when the desired index is not being displayed, the user can enter another character to refine the query at 730. The counter is then incremented by one at 740. The look-up process proceeds at 750 with the entered character and returns to 720 all indexes that have the entered character as well as all previously entered characters in their respective character positions of the indexes.

There are many advantages and benefits of the present invention that can be appreciated by those skilled in the art. According to the principles of this invention, it is disclosed a method and apparatus for displaying a record from structured information with a reduced number of keystrokes. Consequently, a user of a portable device with a small screen and a limited input interface can access and display a certain record from a database quickly and efficiently. Visual feedback is also provided to the user so that the effectiveness of the retrieval or search process can be easily understood.

It is understood to those skilled in the art that the present disclosure of embodiments has been made by way of example only and that numerous changes in the arrangement and combination of parts as well as steps may be resorted without departing from the spirit and scope of the invention as claimed. Accordingly, the scope of the present invention is defined by the appended claims rather than the forgoing description of embodiments.

We claim:

1. A method for displaying a record from a structured database on a display screen of an electronic device having a reduced-size input interface, the structured database including a plurality of records, the records including at least one field and being indexed by indexes comprising n characters, the method comprising:

displaying on the display screen a portion of indexes from the structured database;

receiving successively n symbols from the input interface, the n symbols sequentially and respectively corresponding to the n characters of a desired index of the indexes for the records of the structured database, each of the symbols representing a group of characters one of which corresponds to the associated $n^{th}$ character of the desired index;

displaying on the display screen a reduced portion of the indexes, including the desired index, from the structured database, the reduced portion displays those of the indexes where each of the n characters in the indexes is respectively matched by one of the characters of the group of characters represented by the each of the symbols; and displaying a zoom window positioned upon one of the indexes being displayed on the display screen, the zoom window displaying the one of the indexes and the at least one field of the record.

2. The method as recited in claim 1, wherein the reduced-size input interface is a phone keypad comprising numeric keys and wherein each of the n symbols is one of the numeric keys.

3. The method as recited in claim 1, wherein the reduced-size input interface is soft keys displayed in the display screen and wherein each of the n symbols symbol is one of the soft keys.

4. The method as recited in claim 1, the method still further comprising:

refreshing the display screen with the record corresponding to the one of the indexes having the zoom window positioned thereover after a predetermined key in the input interface is activated.

5. A method for displaying a record from a structured database on a screen, the record including at least one field and indexed by a desired index comprising a string of characters, the method comprising:

initially displaying on the screen an initial portion of indexes from the structured database;

subsequently receiving a first symbol from an input device if the desired index is not among the indexes being displayed on the screen; the first symbol representing a first group of characters one of which is a first character in the string of characters of the desired index; and indicating the desired index with a cursor when the desired index is among the indexes being displayed in the screen and the cursor is scrolled to the desired index, wherein the cursor is a zoom window, the zoom window displaying the desired index and at least one field.

6. The method as recited in claim 5, the method further comprising:

displaying a first number indicating the number of the indexes in the structured database.

7. The method as recited in claim 6, the method still further comprising:

displaying a second number indicating the number of a first chosen indexes that start with any of the characters in the first group represented by the first symbol.

8. The method as recited in claim 5, wherein said indicating the desired index with a cursor comprises:

moving the cursor across a list of adjoining indexes to the desired index.

9. The method as recited in claim 8, wherein said cursor is a zoom window and wherein said moving the cursor across a list of adjoining indexes comprises:

displaying in the zoom window respectively each of the adjoining indexes along with a field of an adjoining record indexed by the each of the adjoining indexes when the zoom window moves across the list of adjoining indexes.

10. The method as recited in claim 5, the method further comprising:

refreshing the screen with only the record being displayed after a predetermined key in an input interface is activated.

11. The method as recited in claim 10, wherein the input interface is a phone keypad comprising numeric keys and wherein the first symbol is one of the numerical keys.

12. The method as recited in claim 10, wherein the input interface is soft keys displayed in the screen and wherein the first symbol is one of the soft keys.

13. The method as recited in claim 5, the method further comprising:

displaying a list of first chosen indexes started with one of the first group of characters.

14. The method as recited in claim 13, wherein said displaying a list of first chosen indexes comprises:

highlighting the first character of first chosen indexes being displayed to indicate that the first symbol has been entered.

15. The method as recited in claim 14, the method still further comprising:

receiving a second symbol from the input device if the desired index is still not among the first chosen indexes being displayed in the screen; the second symbol representing a second group of characters one of which is a second character of the string of characters in the desired index; and displaying a number to indicate the number of chosen indexes that start with one of the characters in the first group represented by the first symbol followed by one of the characters in the second group represented by the second symbol.

16. The method as recited in claim 15, the method still further comprising:

updating the screen with a list of second chosen indexes started with one of the first group of characters corresponding to the first symbol and successively with one of the second group of characters corresponding to the second symbol; and highlighting the second character of the second chosen indexes being displayed to indicate that both of the first symbol and the second symbol have been entered.

17. The method as recited in claim 16, the method still further comprising:

receiving, successively and respectively, subsequent symbols till the desired index is displayed in the screen.

18. The method as recited in claim 17, the method further comprising:

displaying a sign to indicate that the first symbol, the second symbol and the subsequent symbols have been entered.

19. The method as recited in claim 18, wherein the sign indicates graphically a retrieval of the record is being narrowed down with each of the first symbol, the second symbol and the subsequent symbols entered.

20. A method for displaying a record from a structured database on a screen, the record including at least one field and indexed by a desired index comprising a string of characters, the method comprising:

receiving a list of indexes of the structured database;

displaying as many of the indexes sequentially as the screen can accommodate;

receiving respectively and successively, if the desired index is not among the indexes being displayed on the screen; a series of symbols until the desired index is caused to be displayed on the screen, wherein each of the symbols represents a group of characters one of which corresponds to a character in the string of characters of the desired index; and moving a zoom window to the desired index; the zoom window displaying the desired index and the at least one field of the record.

21. The method as recited in claim 20, the method further comprising:

displaying the record completely on the screen after a predefined key is activated.

22. The method as recited in claim 21, wherein said receiving a series of symbols comprises:

displaying, respectively and progressively, a list of chosen indexes with respect to each of the symbols entered.

23. The method as recited in claim 22, the method further comprising:

displaying a sign to indicate the number of the symbols have been entered.

24. The method as recited in claim 23, wherein the sign is a number of icons, each of icons representing one of the symbols that has been entered.

25. The method as recited in claim 23, wherein the sign is a number of highlighted characters in one of the chosen indexes being displayed, each of highlighted characters representing one of the symbols that has been entered.

26. An apparatus for displaying a desired record from a structured database on a screen, the record including at least one field and indexed by a desired index comprising a string of characters, the apparatus comprising:

a screen driver commanding the screen;
an input interface;
a memory for storing code for an application module,
a processor coupled to the memory, the input interface and the screen driver, the processor executing the code in the memory to cause the application module to drive the screen driver to:
display on the screen a portion of indexes from the structured database;
position a zoom window on one of indexes being displayed on the screen; wherein the zoom window displays the one of indexes along with a field of a record indexed by the one of indexes; and
move the zoom window to the desired index when a navigation key is being activated and the desired index is among the indexes being displayed in the screen; wherein the zoom window displays the desired index and the at least one field of the desired record.

27. The device as recited in claim 18, wherein the input interface is a phone keypad comprising a plurality of keys, each representing a group of characters.

28. The device as recited in claim 18, wherein the input interface is a plurality of soft keys, each representing a group of characters.

29. The device as recited in claim 18, wherein the processor executing the code in the memory further causes the application module to drive the screen driver to:

display a list of chosen indexes staring with a character in a group of characters represented by a symbol activated from the input interface.

30. The device as recited in claim 21, wherein the processor executing the code in the memory still causes the application module to drive the screen driver to:

display a sign to indicate the number of symbols activated from the input interface.

31. The device as recited in claim 22, wherein the sign is a number of icons, each of icons representing one of the symbols that has been entered.

32. The method as recited in claim 22, wherein the sign is a number of highlighted characters in one of the chosen indexes being displayed, each of highlighted characters representing one of the symbols that has been entered.

33. A computer readable medium including computer program code for displaying a record from a database on a display screen of an electronic device having a reduced-size input interface, the database including a plurality of records, the records including at least one field and being indexed by indexes of alphanumeric characters, said computer readable medium comprising:

computer program code for receiving a first symbol from the input interface, the first symbol pertaining to a first group of alphanumeric characters, and the first alphanumeric character of a desired index of the indexes for the database being one of the alphanumeric character of the first group;

computer program code for retrieving a first list of the indexes of the database in which their first alphanumeric character matches one of the alphanumeric characters of the first group;

computer program code for displaying on the display screen at least a portion of the retrieved first list of the indexes, the desired index being one of the indexes;

computer program code for receiving a second symbol from the input interface, the second symbol pertaining to a second group of alphanumeric characters, and the second alphanumeric character of the desired index of the indexes for the database being one of the alphanumeric characters of the second group;

computer program code for retrieving a second list of the indexes of the database in which their first alphanumeric character matches one of the alphanumeric characters of the first group and their second alphanumeric character matches one of the alphanumeric characters of the second group; and computer program code for displaying on the display screen at least a portion of the retrieved second list of the indexes, the desired index being one of the indexes.

34. A computer readable medium as recited in claim 33, wherein the electronic device is a mobile device.

35. A computer readable medium as recited in claim 34, wherein the mobile device is a mobile phone.

36. A computer readable medium as recited in claim 33, wherein said computer readable medium further comprises:

computer program code for displaying a count of the number of the indexes within the list being displayed.

37. A computer readable medium as recited in claim 33, wherein said computer readable medium further comprises:

computer program code for displaying a selection indicator that selects one of the indexes being displayed on the display screen and displays at least one field from the record associated with the selected index.

38. A computer readable medium as recited in claim 33, wherein said computer readable medium further comprises:

computer program code for displaying an indicator of the number of symbols that have been used to retrieve the list from the database.

39. A computer readable medium as recited in claim 33, wherein said computer readable medium further comprises:

computer program code for displaying an retrieval effectiveness indicator for each of the symbols that are received, wherein a dimension of the retrieval effectiveness indicator is determined based on the size of the retrieve list of the indexes which are determined to match verses all of the indexes of the database.

* * * * *